(12) United States Patent
Campbell

(10) Patent No.: US 7,775,411 B2
(45) Date of Patent: Aug. 17, 2010

(54) CYCLE BAG WITH AN ADJUSTABLE RETENTION DEVICE FOR SECUREMENT TO A RACK

(76) Inventor: Garry L. Campbell, N1348 Fawn Ridge Ct., Greenville, WI (US) 54942

( * ) Notice: Subject to any disclaimer, the term of this patent is extended or adjusted under 35 U.S.C. 154(b) by 752 days.

(21) Appl. No.: 11/678,436

(22) Filed: Feb. 23, 2007

(65) Prior Publication Data

US 2008/0203126 A1    Aug. 28, 2008

(51) Int. Cl.
   B62J 7/08    (2006.01)
   B62J 7/04    (2006.01)
   B62J 9/00    (2006.01)

(52) U.S. Cl. .................. 224/431; 224/42.4; 224/449; 224/560

(58) Field of Classification Search ............ 248/231.21; 224/431, 448, 449, 452, 453, 445, 319, 42.32, 224/558, 560, 572, 42.4; 410/101, 103, 80, 410/81
   See application file for complete search history.

(56) References Cited

U.S. PATENT DOCUMENTS

| | | | | |
|---|---|---|---|---|
| 4,125,213 A | * | 11/1978 | Watkins | .................. 224/417 |
| 4,249,684 A | * | 2/1981 | Miller et al. | .............. 224/42.4 |
| 5,133,489 A | * | 7/1992 | Loew et al. | .............. 224/42.39 |
| 5,607,093 A | * | 3/1997 | Geier | .......................... 224/318 |
| 5,730,414 A | * | 3/1998 | Wenger et al. | .............. 248/503 |
| 6,029,875 A | * | 2/2000 | Johnston | .................... 224/417 |
| 6,257,470 B1 | * | 7/2001 | Schaefer | ..................... 224/318 |
| 6,299,042 B1 | * | 10/2001 | Smith | ........................ 224/431 |
| 6,354,476 B1 | | 3/2002 | Alderman | .................... 224/413 |
| 6,631,835 B2 | | 10/2003 | Fang | ........................... 224/413 |
| 6,786,374 B2 | * | 9/2004 | Schlecht | ..................... 224/544 |
| 7,258,260 B2 | * | 8/2007 | Hurd | ............................ 224/319 |
| 2004/0118888 A1 | * | 6/2004 | Russell | ...................... 224/413 |
| 2008/0073396 A1 | * | 3/2008 | Chiang et al. | .............. 224/413 |

FOREIGN PATENT DOCUMENTS

| | | | | |
|---|---|---|---|---|
| DE | 3126666 A1 | * | 1/1983 | |
| DE | 4434542 A1 | * | 4/1996 | |
| DE | 102006018237 A1 | * | 10/2007 | |
| FR | 2711595 A1 | * | 5/1995 | |
| GB | 2400088 A | * | 10/2004 | |
| JP | 2006088795 A | * | 4/2006 | |

* cited by examiner

*Primary Examiner*—Justin M Larson
(74) *Attorney, Agent, or Firm*—Donald J. Ersler

(57) ABSTRACT

A cycle bag with adjustable retention device for securement to a rack includes a cycle bag, at least one adjustable attachment device and at least two strap retainers. The cycle bag preferably includes a compartment for storing objects and a cover hinged to the compartment. Each adjustable attachment device includes a base, two hooks and two straps. Each adjustable attachment device is attached to a bottom of the cycle bag. The two hooks are slidable retained by the adjustable attachment device and a single strap is attached to each hook. Strap retainers are located inside the cycle bag. The cycle bag is placed on a rack. The at least two hooks are slipped over rails of the rack. One of the first or second straps is pulled, until the cycle bag is centered on the rack. The first and second straps are then secured in their respective strap retainers.

17 Claims, 6 Drawing Sheets

CYCLE BAG WITH AN ADJUSTABLE RETENTION DEVICE FOR SECUREMENT TO A RACK

BACKGROUND OF THE INVENTION

1. Field of the Invention

The present invention relates generally to cycle bags and more specifically to a cycle bag with adjustable retention device for securement to a rack, which enables a cycle bag to be attached to different sizes and types of racks.

2. Discussion of the Prior Art

U.S. Pat. No. 6,354,476 to Alderman discloses snap-on motorcycle luggage. The Alderman patent includes a storage container attached to a rigid base plate. The base plate is arranged to be snapped on to a conventional motorcycle body in place of a removable rear seat. U.S. Pat. No. 6,631,835 to Fang discloses an object storing case of a motorcycle. The Fang patent includes a connecting part disposed in a recess of a rear side of a holding body thereto, a fixing plate pivoted to the connecting part at the middle, a locking member and an operating member.

Accordingly, there is a clearly felt need in the art for a cycle bag with adjustable retention device for securement to a rack, which allows a cycle bag to be firmly attached to different sizes and types of racks.

SUMMARY OF THE INVENTION

The present invention provides a cycle bag with adjustable retention device for securement to a rack of different sizes and types. The cycle bag with adjustable retention device for securement to a rack (cycle bag with adjustable attachment) includes a cycle bag, at least one adjustable attachment device and at least two strap retainers. The cycle bag preferably includes a compartment for storing objects and a cover hinged to the compartment. Each adjustable attachment device includes a base, two hooks and two straps. The base includes two slots for slidably retaining the two hooks. One end of a single strap is attached to a single hook, such that pulling the strap causes the hook to move in one of the two slots. Opposing ends of the base are attached to opposing ends of the cycle bag. A strap opening is formed through a bottom of the cycle bag at substantial each end to receive the at least two straps.

At least one first strap retainer is mounted to an inside of the compartment to retain the at least one first strap on a first end of the cycle bag. At least one second strap retainer is mounted to an inside of the compartment to retain the at least one second strap on a second end of the cycle bag. The cycle bag is mounted to a rack by placing the cycle bag on the rack. The at least two hooks are slipped over rails of the rack. To secure the cycle bag to a rack, the at least one first or second strap is pulled, until the cycle bag is centered on the rack. The at least one first or second strap is secured in its at least one respective strap retainer. The other second or first strap is pulled taut and secured in its at least one respective strap retainer.

Accordingly, it is an object of the present invention to provide a cycle bag with adjustable attachment, which allows the cycle bag to be firmly attached to different sizes and types of racks.

These and additional objects, advantages, features and benefits of the present invention will become apparent from the following specification.

DETAILED DESCRIPTION OF THE PREFERRED EMBODIMENTS

Figure 1:
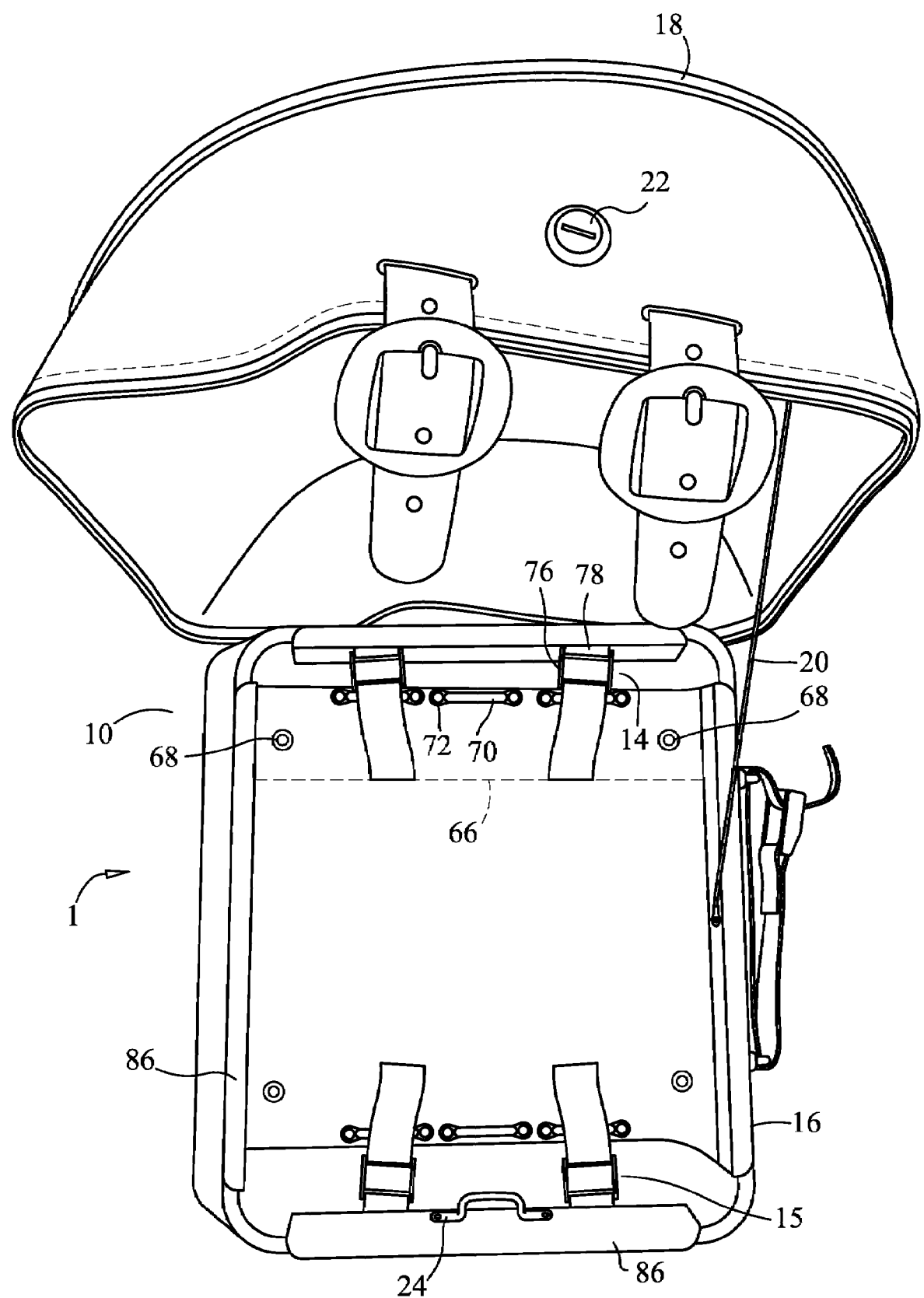
FIG. 1 is a perspective view of an opened cycle bag with adjustable attachment in accordance with the present invention.
Figure 2:
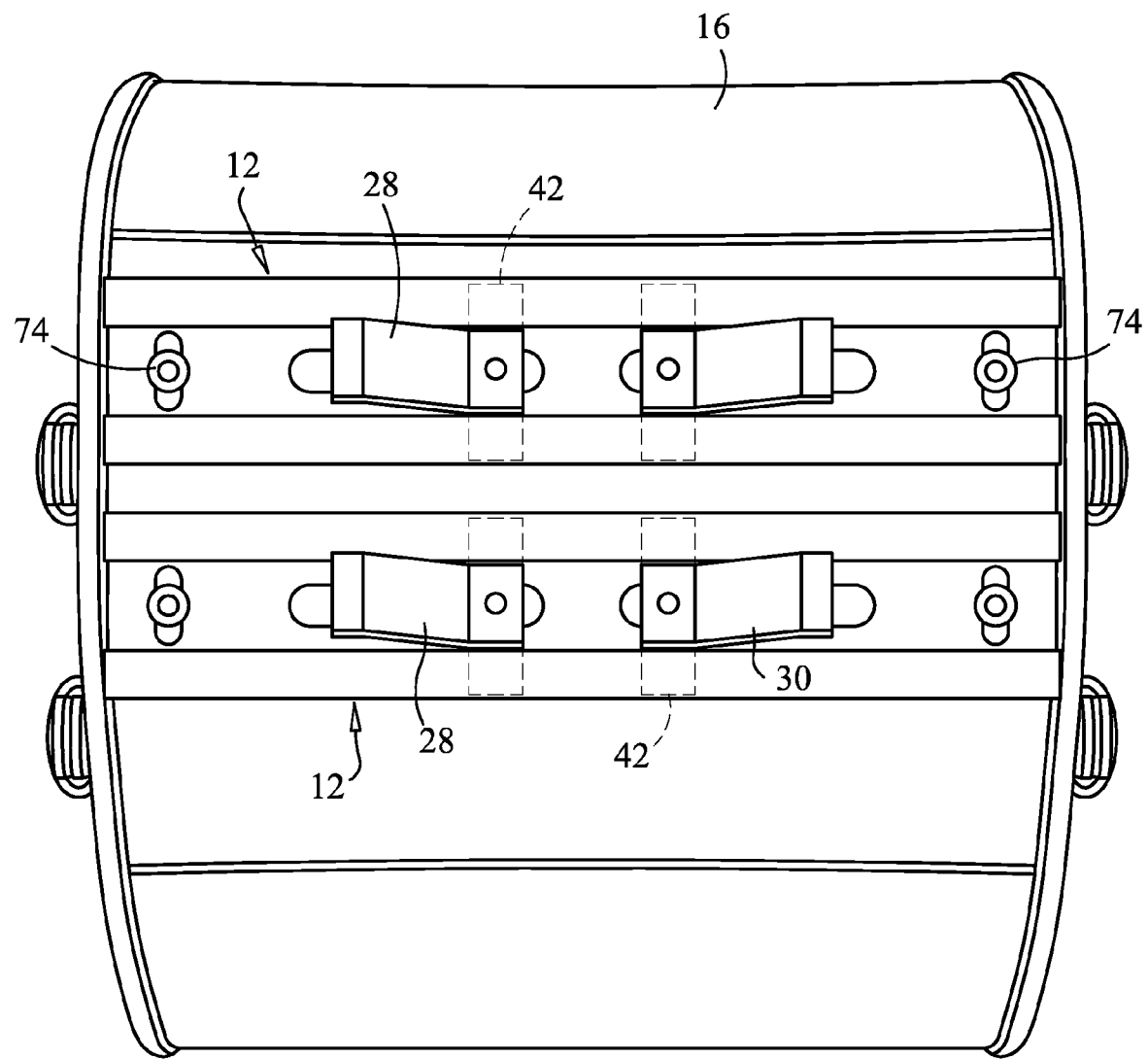
FIG. 2 is a bottom perspective view of a cycle bag with adjustable attachment in accordance with the present invention.
Figure 3:
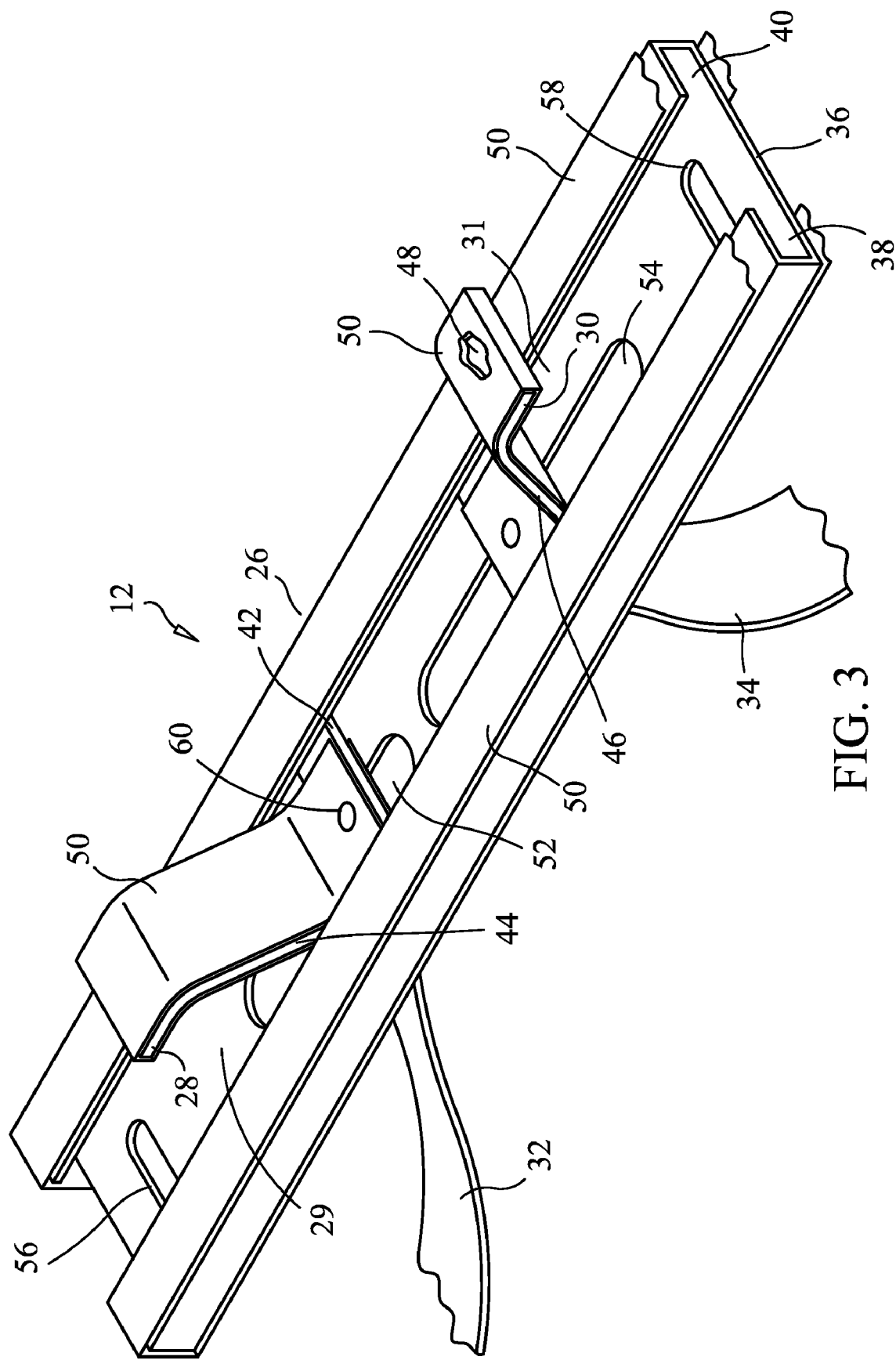
FIG. 3 is a bottom perspective view of an adjustable attachment device of a cycle bag with adjustable attachment in accordance with the present invention.
Figure 4:
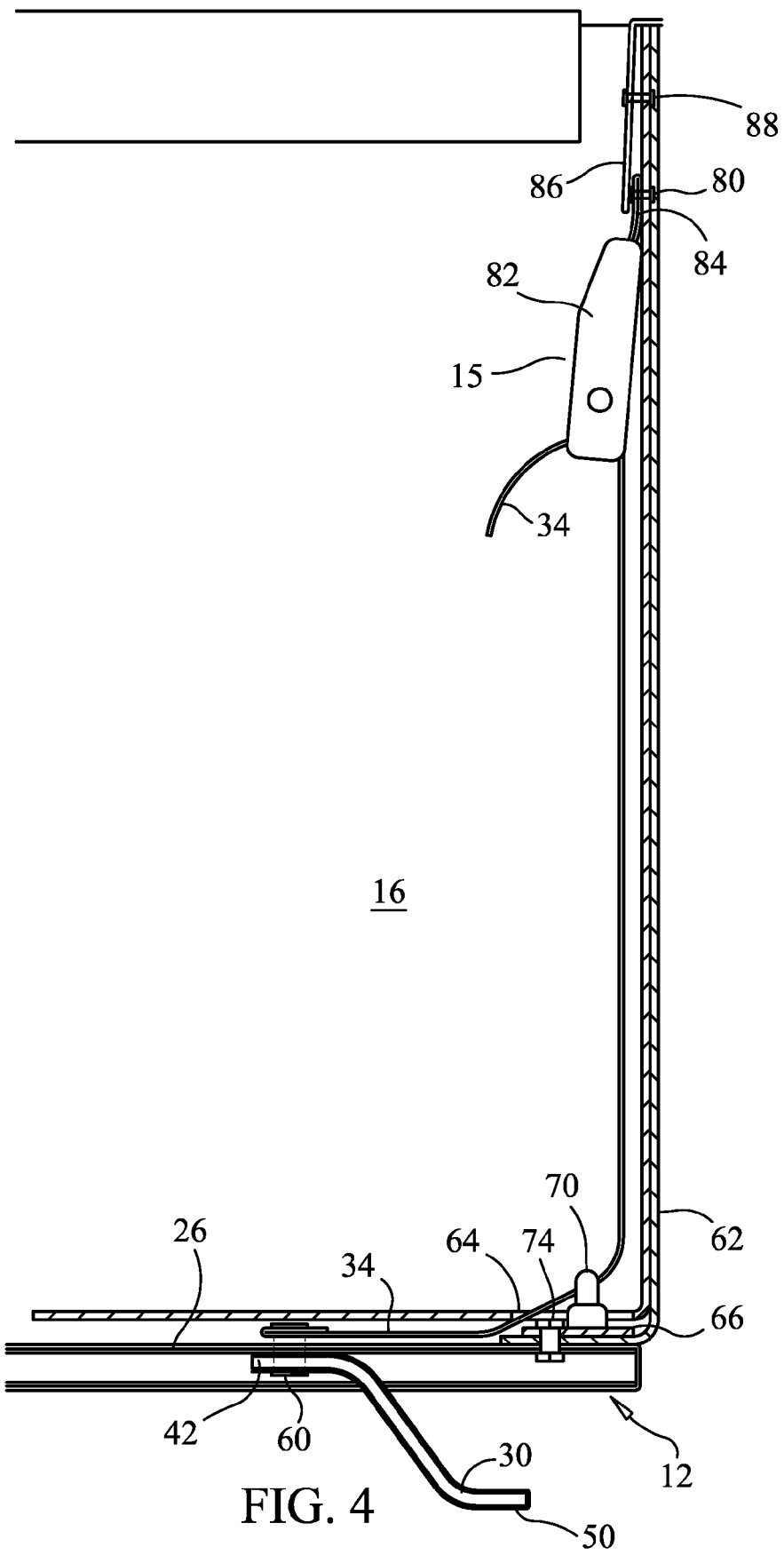
FIG. 4 is a cross sectional view of one end of a cycle bag with adjustable attachment in accordance with the present invention.

With reference now to the drawings, and particularly to FIG. 1, there is shown a perspective view of an opened cycle bag with adjustable attachment 1. With reference to FIGS. 2-4, the cycle bag with adjustable attachment 1 includes a cycle bag 10, at least one adjustable attachment device 12 and at least two strap retainers 14, 15. The cycle bag 10 preferably includes a compartment 16 and a cover 18. One end of the cover 18 is preferably retained on one end of the compartment 16 with a hinge or the like. The compartment 16 is used to store objects. Preferably, a cover stop 20 is used to prevent the cover 18 from tipping all the way over when opened. The cover stop 20 is preferably a small cable. One end of the cover stop 20 is attached to the cover 18 and the other end is attached to the compartment 16. A rotary lock 22 is preferably mounted in the other end of the cover 18. The rotary lock 22 engages a latch 24 mounted to the other end of the compartment 16. Rotary locks are well known in the art and need not be explained in detail.

Each adjustable attachment device 12 includes a base 26, a first hook 28, a second hook 30, a first strap 32 and a second strap 34. A first open end 29 of said first hook 28 and a second open end 31 of said second hook 30 preferably face away from each other, but could face toward each other. The base 26 includes a base plate 36, a first retention rail 38 and a second retention rail 40. The first retention rail 38 extends from one side of the base plate 36 and the second retention rail 40 extends from the other side of the base plate 36. Each hook 28, 30 includes a hook base 42 and a hook portion 44. The hook base 42 is retained, under the first and second rails. The hook portion 44 extends upward from the hook base 42. The hook portion 44 includes an angled body 46 and a lip extension 48. The angled body 46 accommodates different thicknesses of racks. The first retention rail 38, the second retention rail 40, the first hook 28 and the second hook 30 are preferably covered with a non-scratch material 50 such as VELCRO to prevent a rack from being scratched. The non-scratch material 50 is retained on a surface of the retention rails 38, 40 and the hooks 28, 30 with a pressure sensitive adhesive on a back surface of the non-scratch material 50.

A first slot 52 is formed through the base plate 26 in substantially a first half and a second slot 54 is formed through the base plate 36 in substantially a second half. A first retention opening 56 is formed through a first end of the base plate 36 and a second retention opening 58 formed through a second end of the base plate 36. A rivet 60 or the like is inserted through the hook base 42, the base plate 36 and one end of the strap 32, 34 and secured thereto, such that the hook base 42 slides relative to the base plate 36.

The compartment 16 is preferably fabricated from a hard plastic. A layer of leather 62 or the like covers the outer surface of the compartment 16. A strap opening 64 is cut through a bottom of the compartment 16 at substantial each end to receive at least one strap 32, 34. A support plate 66 is attached to a bottom of the compartment 16 at each end with rivets 68 or the like. At least one strap loop 70 is attached to the support plate 66 with two rivets 72 or the like. Each end of the base 26 is attached to one of the two support plates 66 with a fastener 74 or the like.

Each first strap retainer 14 includes a first strap base 76 and a first strap extension 78. The first strap extension 78 is preferably attached to a side wall of the compartment with at least one rivet 80 at a first end thereof (not shown). Each second strap retainer 15 includes a second strap base 82 and a second strap extension 84. The second strap extension 84 is attached to a side wall of the compartment 16 with at least one rivet 80 at a first end thereof. Strap retainers are well known in the art and need not be explained in detail. Four stiffener plates 86 may be attached to a top perimeter of the compartment 16 and secured thereto with fasteners 88 to improve the rigidity of the compartment 16.

Figure 5:
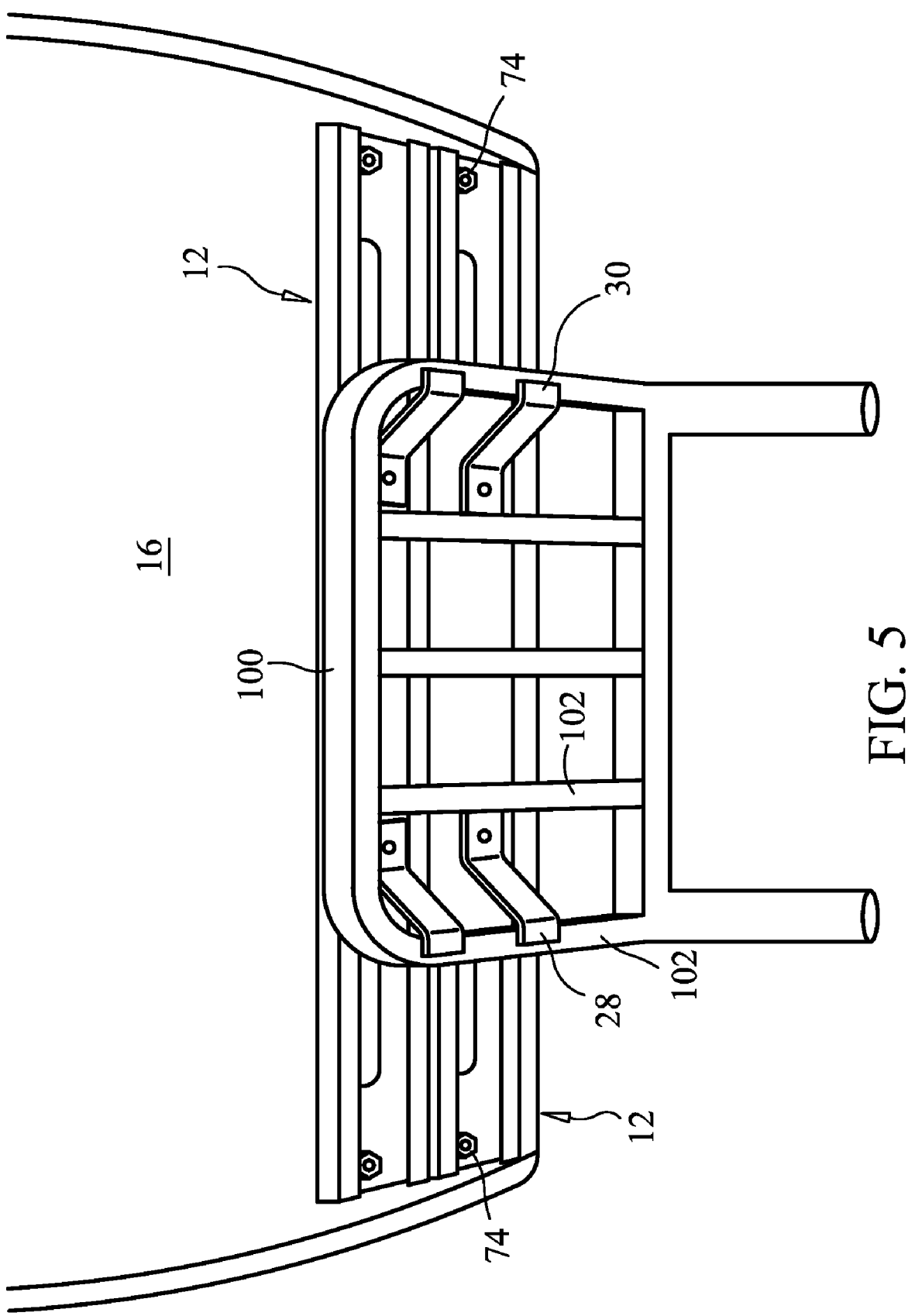
FIG. 5 is a bottom view of a cycle bag with adjustable attachment secured to a rack in accordance with the present invention.
Figure 6:
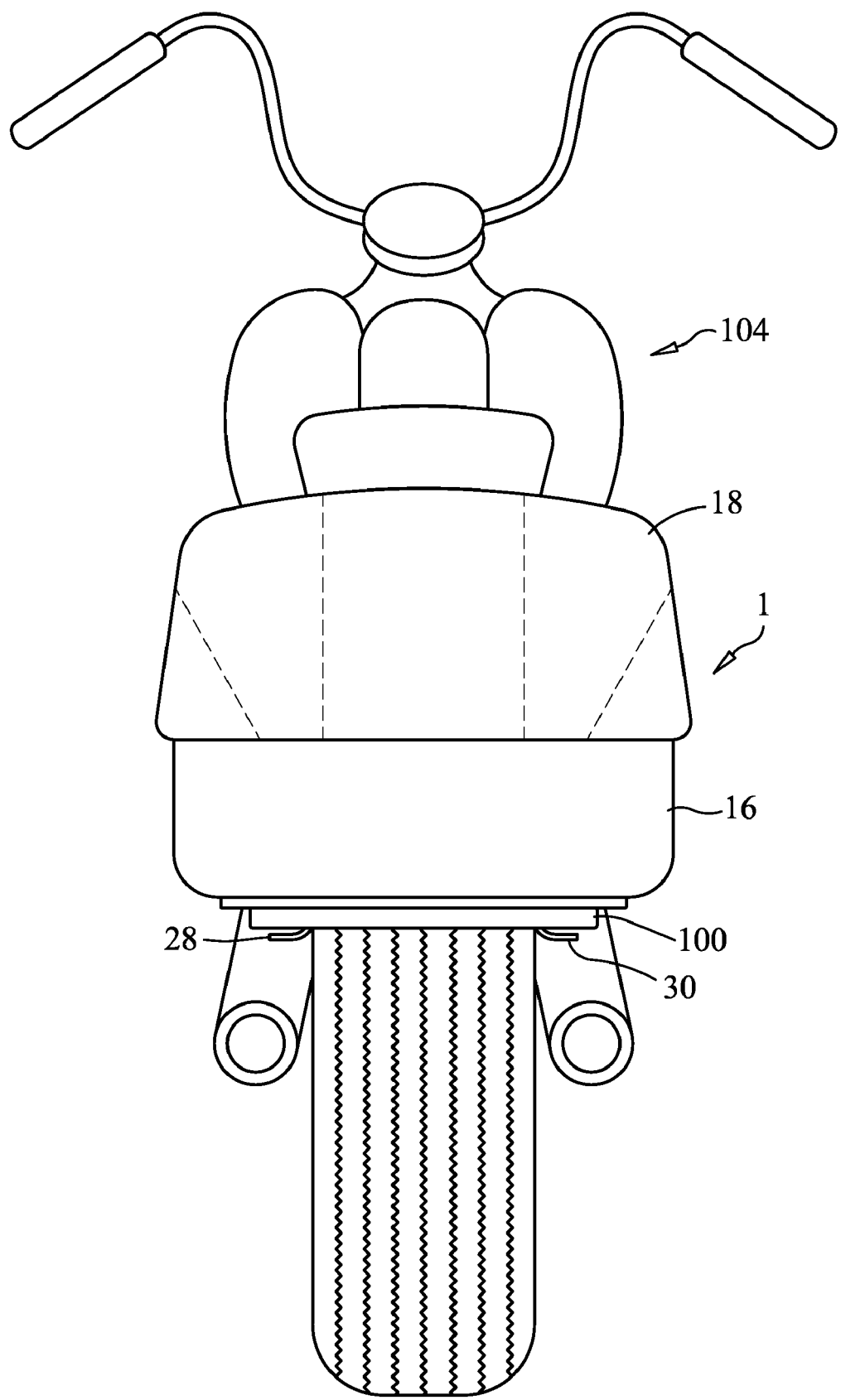
FIG. 6 is a front view of a cycle bag with adjustable attachment secured to a rack on a motorcycle in accordance with the present invention.

With reference to FIG. 5, the cycle bag 10 is mounted to a rack 100 by placing thereof on the rack 100. With reference to FIG. 6, the rack 100 is mounted to some portion of a motorcycle 104. The hooks 28, 30 are slipped over rails 102 of the rack 100. The at least one first or second strap is pulled, until the cycle bag 10 is centered on the rack 100. The at least one first or second strap is secured in its at least one respective strap retainer. The other second or first strap is pulled taut and secured in its at least one respective strap retainer.

When the cycle bag 10 is locked, the straps 32, 34 cannot be unloosed to remove the cycle bag 10 from the rack 100. Further, the straps 32, 34 cannot be cut, because the straps 32, 34 are covered by the at least one adjustable attachment device 12 and protected inside the cycle bag 10.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A cycle bag with adjustable attachment, comprising:
    a cycle bag including a compartment, said compartment including a plurality of side walls and a bottom wall disposed on a bottom of said plurality of side walls;
    at least one first hook being slidably retained on said bottom wall, at least one second hook being slidably retained on said bottom wall;
    a first strap extending from one of said at least one first hook, said one first hook sliding substantially parallel to said bottom wall when pulled by said first strap;
    at least one first strap loop is mounted to said bottom wall, adjacent to one of said plurality of side walls, said first strap is slidably retained by one of said at least one first strap loop, said at least one first strap loop is located inside said cycle bag;
    a second strap extending from one of said at least one second hook, said one second hook sliding substantially parallel to said bottom wall when pulled by said second strap;
    at least one second strap loop is mounted to said bottom wall, adjacent to an opposing one of said plurality of side walls, said second strap is slidably retained by one of said at least one second strap loop, said at least one second strap is located inside said cycle bag; and
    a first strap retainer retaining said first strap and a second strap retainer retaining said second strap, said first and second strap retainers are located inside said cycle bag.

2. The cycle bag with adjustable attachment of claim 1, further comprising:
    at least one adjustable attachment device being mounted to said bottom wall, each one of said at least one adjustable attachment device including one of said at least one first hook slidably retained thereby and one of said at least one second hook slidably retained thereby.

3. The cycle bag with adjustable attachment of claim 1, further comprising:
    an open end of said at least one first hook and an open end of said at least one second hook being sized to receive a rail of a rack.

4. The cycle bag with adjustable attachment of claim 1, further comprising:
    an open end of one of said at least one first hook and an open end of one of said at least one second hook facing away from each other.

5. The cycle bag with adjustable attachment of claim 1, further comprising:
    a first retention opening being formed through said bottom wall at a first end and a second retention opening being formed through said bottom wall at a second end.

6. The cycle bag with adjustable attachment of claim 1, further comprising:
    said first strap retainer being mounted to one side wall of said compartment and said second strap retainer being mounted to an opposing side wall of said compartment.

7. A cycle bag with adjustable attachment, comprising:
    a cycle bag including a compartment, said compartment including a plurality of side walls and a bottom wall disposed on a bottom of said plurality of side walls;
    at least one first hook being slidably retained on said bottom wall, at least one second hook being slidably retained on said bottom wall;
    a first strap extending from one of said at least one first hook, said one first hook sliding substantially parallel to said bottom wall when pulled by said first strap;
    at least one first strap loop is mounted to said bottom wall, adjacent to one of said plurality of side walls, said first strap is slidably retained by one of said at least one first strap loop, said at least one first strap loop is located inside said cycle bag;
    a second strap extending from one of said at least one second hook, said one second hook sliding substantially parallel to said bottom wall when pulled by said second strap, said first and second straps being inserted through at least one opening in said bottom of said compartment;
    at least one second strap loop is mounted to said bottom wall, adjacent to an opposing one of said plurality of side walls, said second strap is slidably retained by one of said at least one second strap loop, said at least one second strap is located inside said cycle bag; and a first strap retainer retaining said first strap and a second strap retainer said second strap, said first and second strap retainers are located inside said cycle bag.

8. The cycle bag with adjustable attachment of claim 7, further comprising:
at least one adjustable attachment device being mounted to said bottom wall, each one of said at least one adjustable attachment device including one of said at least one first hook slidably retained thereby and one of said at least one second hook slidably retained thereby.

9. The cycle bag with adjustable attachment of claim 7, further comprising:
an open end of said at least one first hook and an open end of said at least one second hook being sized to receive a rail of a rack.

10. The cycle bag with adjustable attachment of claim 7, further comprising:
an open end of one of said at least one first hook and an open end of one of said at least one second hook facing away from each other.

11. The cycle bag with adjustable attachment of claim 7, further comprising:
said at least one opening being a first retention opening formed at a first end of said cycle bag and a second retention opening formed at a second end of said cycle bag.

12. The cycle bag with adjustable attachment of claim 7, further comprising:
said first strap retainer being mounted to one side wall of said compartment and said second strap retainer being mounted to an opposing side wall of said compartment.

13. A cycle bag with adjustable attachment, comprising:
a cycle bag including a compartment, said compartment including a plurality of side walls and a bottom wall disposed on a bottom of said plurality of side walls;
at least one adjustable attachment device being mounted to said bottom wall, each one of said at least one adjustable attachment device including a first hook slidably retained thereby substantially parallel to said bottom wall and a second hook slidably retained thereby substantially parallel to said bottom wall;
a first strap extending from said first hook and a second strap extending from said second hook;
at least one first strap loop is mounted to said bottom wall, adjacent to one of said plurality of side walls, said first strap is slidably retained by one of said at least one first strap loop, said at least one first strap loop is located inside said cycle bag;
at least one second strap loop is mounted to said bottom wall, adjacent to an opposing one of said plurality of side walls, said second strap is slidably retained by one of said at least one second strap loop, said at least one second strap is located inside said cycle bag; and
a first strap retainer retaining said first strap and a second strap retainer retaining said second strap, said first and second strap retainers are located inside said cycle bag.

14. The cycle bag with adjustable attachment of claim 13, further comprising:
an open end of said at least one first hook and an open end of said at least one second hook being sized to receive a rail of a rack.

15. The cycle bag with adjustable attachment of claim 13, further comprising:
an open end of said first hook and an open end of said second hook facing away from each other.

16. The cycle bag with adjustable attachment of claim 13, further comprising:
a first retention opening being formed through said bottom wall at a first end and a second retention opening being formed through said bottom wall at a second end.

17. The cycle bag with adjustable attachment of claim 13, further comprising:
said first strap retainer being mounted to one side wall of said compartment and said second strap retainer being mounted to an opposing side wall of said compartment.

* * * * *